(12) United States Patent
Skipper

(10) Patent No.: US 8,293,154 B2
(45) Date of Patent: Oct. 23, 2012

(54) MOULDING PROCESS

(75) Inventor: Richard Stuart Skipper, Shawford (GB)

(73) Assignee: Polymer Sciences Limited, Hampshire (GB)

( * ) Notice: Subject to any disclaimer, the term of this patent is extended or adjusted under 35 U.S.C. 154(b) by 288 days.

(21) Appl. No.: 10/597,172

(22) PCT Filed: Jan. 13, 2005

(86) PCT No.: PCT/GB2005/000107
§ 371 (c)(1),
(2), (4) Date: Sep. 10, 2008

(87) PCT Pub. No.: WO2005/068164
PCT Pub. Date: Jul. 28, 2005

(65) Prior Publication Data
US 2008/0315444 A1     Dec. 25, 2008

(30) Foreign Application Priority Data

Jan. 13, 2004  (GB) .................................. 0400666.4
Oct. 18, 2004  (GB) .................................. 0422966.2
Nov. 15, 2004  (GB) .................................. 0425105.4

(51) Int. Cl.
*C04B 41/00*    (2006.01)
(52) U.S. Cl. ........... 264/132; 264/1.1; 264/1.6; 264/2.6; 264/2.7
(58) Field of Classification Search .................. 246/132; 264/1.1, 1.6, 2.6, 2.7
See application file for complete search history.

(56) References Cited

U.S. PATENT DOCUMENTS

| 4,402,579 A * | 9/1983 | Poler .......................... 351/160 R |
| 4,619,793 A * | 10/1986 | Lee ................................. 264/2.6 |
| 4,652,721 A | 3/1987 | Miller et al. |
| 4,786,446 A | 11/1988 | Hammar et al. |
| 5,166,528 A * | 11/1992 | Le Vay ...................... 250/455.11 |
| 6,113,817 A * | 9/2000 | Herbrechtsmeier et al. . 264/1.36 |
| 6,474,465 B1 * | 11/2002 | Jux ................................. 206/5.1 |
| 2002/0163638 A1 * | 11/2002 | Biel et al. .................... 356/239.2 |
| 2004/0112008 A1 * | 6/2004 | Voss et al. .................... 53/329.3 |

FOREIGN PATENT DOCUMENTS

| EP | 0093944 | 11/1983 |
| EP | 0131227 | 1/1985 |
| EP | 0686484 | 12/1995 |
| GB | 699014 | 10/1953 |
| GB | 819474 | 9/1959 |
| GB | 2105866 | 3/1983 |
| GB | 2119957 | 11/1983 |
| JP | 60108408 | 6/1985 |

(Continued)

OTHER PUBLICATIONS

Effect of degree of saponification on properties of films obtained from PVA/NaCl/H2O system; Iwaseya et al; J Mater Sci 41 (2006) 1979-1982).*
Polyvinyl alcohol fibers, Ichiro Sakurada (CRC Press; 1985; 9780824774349).*

(Continued)

*Primary Examiner* — Yogendra Gupta
*Assistant Examiner* — John Robitaille
(74) *Attorney, Agent, or Firm* — Fogg & Powers LLC

(57) ABSTRACT

A highly effective and cost-effective method and apparatus for manufacturing soft contact lenses by physically forming the lenses form sheet (or other solid) material in a batch or continuous process.

24 Claims, 1 Drawing Sheet

FOREIGN PATENT DOCUMENTS

| | | |
|---|---|---|
| JP | 02235729 | 9/1990 |
| JP | 05220828 | 8/1993 |
| JP | 09183153 | 7/1997 |
| WO | 9842497 | 10/1998 |
| WO | 0115497 | 3/2001 |

OTHER PUBLICATIONS (Amjad, Zahid (ed); Water Soluble Polymers—Solution Properties and Applications; Springer—Verlag; 1998; pp. 31-40).*

* cited by examiner

MOULDING PROCESS

This application claims the priority under 35 U.S.C. 371 of prior PCT application PCT/GB2005/000107, filed Jan. 13, 2005, which in turn claims the priority of prior Great Britain patent application nos. 0400666.4, filed Jan. 13, 2004; 0422966.2, filed Oct. 18, 2004; and 0425105.4, filed Nov. 15, 2004, all of which are incorporated herein in their entirety by reference.

FIELD OF THE INVENTION

The present invention relates to a method and apparatus for producing a plurality of ophthalmic lenses such as soft contact lenses and ophthalmic lenses thus produced.

BACKGROUND ART

The conventional method of producing ophthalmic lenses is to form a lens blank by polymerisation of liquid monomers in a mould and to subsequently mechanically lathe the lens blank into a finished lens and to polish the lens to remove imperfections. This method is labour-intensive and expensive.

In recent times, double-sided cast moulding (DSCM) processes have been developed. These processes generally involve the initial production (by moulding) of single-use male and female moulds. Liquid monomers are then deposited into the female mould and the male and female moulds are mated together. The monomers are then cured by heating to form the desired polymer lens (the term 'cured' means that the material being cured is rendered insoluble in a solvent in which it was previously soluble and the term is thus a generic term covering more specific terms such as polymerisation, crosslinking, vulcanisation etc.). The lens is removed from the mould and is washed to extract unreacted monomers and/or solvents. The moulds are then discarded and the lenses are packed in final packs.

It is to be noted that the controllable moulding process in such a DSCM process is the moulding of the single-use moulds rather than that of the lenses themselves. The most common way of producing the single-use moulds is to produce them between two platens with removably mounted, precisely machined inserts mounted on the platens. A change of mould shape (in order to produce a lens with different optical qualities) is achieved through a change of inserts in the moulding platen. The inserts are generally created on a precision lathe and are polished to remove surface imperfections. Some particular lens optical qualities are created by controlling the orientation of the male to the female mould.

Thus in a DSCM process, it is the shapes of the disposable moulds which determine the shape and power of the final lens.

U.S. Pat. No. 5,508,317 discloses an improvement to standard DSCM in which an aqueous solution of prepolymer is introduced into the mould and curing is effected by photo-crosslinking. It is claimed that this gives the advantage of allowing the washing/extraction step of standard DSCM to be dispensed with.

Other improvements which have been proposed to DSCM include making one of the moulds reusable and making at least one of the moulds UV-transparent to allow UV curing.

WO 98/42497 discloses the curing of lenses produced using a DSCM process by the use of UV alone.

U.S. Pat. Nos. 4,673,539 and 4,786,446 disclose a different production process approach involving creating a shaped thermoplastic hydrogel precursor by the thermoforming of a particular form of uncrosslinked polymer (one containing the product of an ethylenically-unsaturated monomer bearing at least one trihaloacetoxy-substitute group), subsequently solvolyzing the precursor in the presence of a diluent in order to form a polymeric shaped article and finally hydrating the shaped article to provide an ophthalmic lens. This process is claimed to produce lenses with high and controllable water sorbency characteristics.

DSCM processes suffer from problems with quality variation in production caused both by control of mould quality in the two-step casting procedure and by variability in the curing process. In the practical environment of a commercial production process, the curing process is always subject to variations in monomer mixtures and variations in monomer mixture components. A practical curing process is also subject to changes in cure rates due to fluctuations in energy of the (normally thermal) curing source.

All prior art processes suffer from problems of manufacturing efficiency—being, at best, batch processes requiring significant human involvement and, at worst, effectively custom-manufacturing processes requiring skilled operators for each and every process step. Due to this, the cost of production of ophthalmic lenses is relatively high.

It is an object of this invention to provide a method for producing ophthalmic lenses with improved manufacturing efficiency compared to prior art methods. In particular, the method of the current invention provides increased consistency and quality of production as well as a reduction in the quantity of process steps required when compared with prior art methods.

It is a further object of this invention to reduce the quantity of material consumed by the moulding and curing process for an ophthalmic lens and thus, in this way, to reduce the environmental impact of the moulding and curing process.

It is a further object of this invention to also reduce the environmental impact of the moulding and curing process by reducing the amount of wet-chemistry and associated chemical waste products when compared with prior art processes.

SUMMARY OF THE INVENTION

The present invention overcomes the problems mentioned above through provision of a method of producing a plurality of soft contact lenses in which a solid, substantially dry material is provided, which is water-soluble above a certain temperature. This material is then formed into a plurality of shaped lens blanks through controlled application of physical force to the material and the shaped lens blanks are subsequently hydrated at a temperature below the certain temperature (above which the material is water-soluble) to form a plurality of soft contact lenses.

The present invention also provides an apparatus for producing a plurality of soft contact lenses comprising a forming means for applying a controlled physical force to a sheet of material in order to form a plurality of shaped lens blanks and sheet material transport means comprising driven and/or undriven roller means for transporting a sheet of material.

In preferred embodiments of the method provided by the invention, the certain temperature, above which the material is water-soluble is either approximately 50° C. or approximately 65° C.

In other desirable embodiments of the method of the invention, the material may be:
polyvinyl alcohol or
a copolymer of polyvinyl alcohol and polyvinyl acetate or
polyethylene-maleic-anhydride or
polymethyl-hydroxy-propyl-cellulose or
copolymers of methyl acrylate or ethyl acrylate with ethylene or their hydroxy derivatives or a copolymer of polyvinyl alcohol and polyvinyl acetate where the degree of hydrolysis, as measured by saponification, is at least 96% mol based on the original polyvinyl alcohol.

In a further desirable embodiment of the method of the invention, the material is a substantially uncrosslinked polymer comprising crosslinkable groups. In this embodiment, prior to the hydration step C, high energy is applied to the shaped lens blanks, crosslinking the polymer to a predetermined, desired crosslink density. The polymer may also contain additives that react to the application of high energy to improve crosslinking efficiency. 'High energy' may be in any of the following forms:

electron beam irradiation or
gamma irradiation or
microwave irradiation or
ultraviolet irradiation or
infrared irradiation or
thermal irradiation or
ultrasound irradiation.

In a particularly preferred embodiment of the method of the invention, the material is provided in as a sheet of material and the shaped lens blanks remain at least partially attached to this sheet of material after the physical forming step B. This allows the sheet to be used as a transport medium/carrying mechanism for the shaped lens blanks. A further desirable implementation for such a method is to remove the shaped lens blanks from the sheet, at the appropriate point in the process using a laser cutting device.

The physical forming step B may be carried out using a number of different processes such as:

thermoforming or
vacuum forming or
pressing or
hot moulding or
cold moulding or
compression moulding or
injection moulding.

In a preferred, thermoforming embodiment of the method of the invention, the material is heated to a temperature that is near to the softening temperature of the material, so that thermoforming of the material is possible, but is below the melting point of the material, so that the physical integrity of the material is maintained. Thermoforming of the shaped lens blanks is then carried out through application of physical force to the heated material. The physical force might be applied by compressing the material between two forms or platens.

In some preferred embodiments, the physical forming step B uses moulds. The material is placed between the moulds and these are pressed together to form said plurality of shaped lens blanks.

Further desirable features include the application of high energy (electron beam irradiation or gamma irradiation or microwave irradiation or ultraviolet irradiation) to sterilise either the lens blanks or the lenses.

In some further embodiments, the shaped lens blanks are transferred to a plurality of final packs. These final packs may be pre-sterilised. They may also contain the aseptic or sterile solution, which acts to hydrate the lenses in step C. In some such embodiments the material of the shaped lens blanks may undergo a chemical reaction, such as hydrolysis, in the final pack.

In a particularly preferred embodiment, all process steps after step B are carried out without further human contact or handling. The method may thus be automated or semi-automated to run in a continuous or semi-continuous manner.

In some embodiments, quality control inspections are carried out on the shaped lens blanks only. These inspections may be either visual or may use an optical system.

The invention also provides a method of producing a plurality of ophthalmic lenses, which comprises (a) providing a substantially uncrosslinked polymer, comprising crosslinkable groups; (b) physically forming this polymer into a plurality of ophthalmic lenses; and (c) applying high energy to the plurality of ophthalmic lenses thus crosslinking the polymer to a predetermined, desired crosslink density.

In a preferred embodiment of the apparatus of the invention, the forming means comprises a plurality of forms or platens arranged so that they press together to form the sheet of material into a plurality of shaped lens blanks. This plurality of forms or platens may be provided with heating means to heat the sheet of material to make the forming process easier.

In some desirable embodiments, the plurality of platens are removably connectable with a plurality of male and female inserts. These male and female inserts are formed to appropriate shapes to form the shaped lens blanks to desired optical specifications. The inserts may be arranged such that pressure (either positive or negative) may be applied through them.

In preferred embodiments of the apparatus of the invention, the apparatus further comprises packaging means for transferring said shaped lens blanks into final packs. This packaging means may be arranged to carry out packaging in a substantially sterile environment.

In particularly preferred embodiments, the apparatus of the invention also comprises a removing means for removing the shaped lens blanks from the sheet of material and for forming the circumferential edges of the shaped lens blanks. This removing means may be a laser cutting means such as a CO2 laser.

Some preferred embodiments of the apparatus provided by the invention also comprise high energy application means for applying high energy to the shaped lens blanks and/or to soft contact lenses formed from the shaped lens blanks. This high energy application means could be an electron beam irradiation means.

The current invention has many advantages over prior art production methods for ophthalmic lenses:

When using the current invention, there is no loss of precision in lens shape due to allowances that must be made in prior art methods both for shrinkage in the moulds as they cool and for shrinkage in initial monomer volume due to polymerisation (typically a shrinkage of roughly 16% which is very difficult to control accurately).

When using the current invention, there is no need to store and maintain an inventory of single-use moulds, which are not currently in use.

Since there is no need for producing disposable moulds, which are not part of the final product, the current invention produces a dramatic reduction in waste material.

Due to using more easily-controllable process steps, lenses produced using the current invention have an improved accuracy of lens power, improved surface quality and improved power consistency vis-à-vis those produced using prior art methods.

Some particular embodiments of the current invention provide improved sterilisation, packaging and in-line inspection steps over prior art methods of production. These improvements can also lead to a reduced manufacturing area requirement.

Compared to known methods of using reusable glass moulds, the current invention has the advantage that mould washing and inspections for mould cleanliness is not required as frequently.

In the known methods which use curing by UV alone, UV-absorbing agents cannot be incorporated into lenses, since these then inhibit the polymerisation process. In the current invention, non-UV forms of irradiation may be employed when it is desired to create lenses containing such UV-absorbing agents.

Other aspects and advantages of the invention will be clear from a study of the following detailed description and drawings in which a particular embodiment of the invention is described consisting of a manufacturing process for contact lenses, wherein a contact lens is used as a particular example of an ophthalmic lens and e-beam irradiation is used as a particular example of a means of application of high energy.

DETAILED DESCRIPTION

Figure 1:
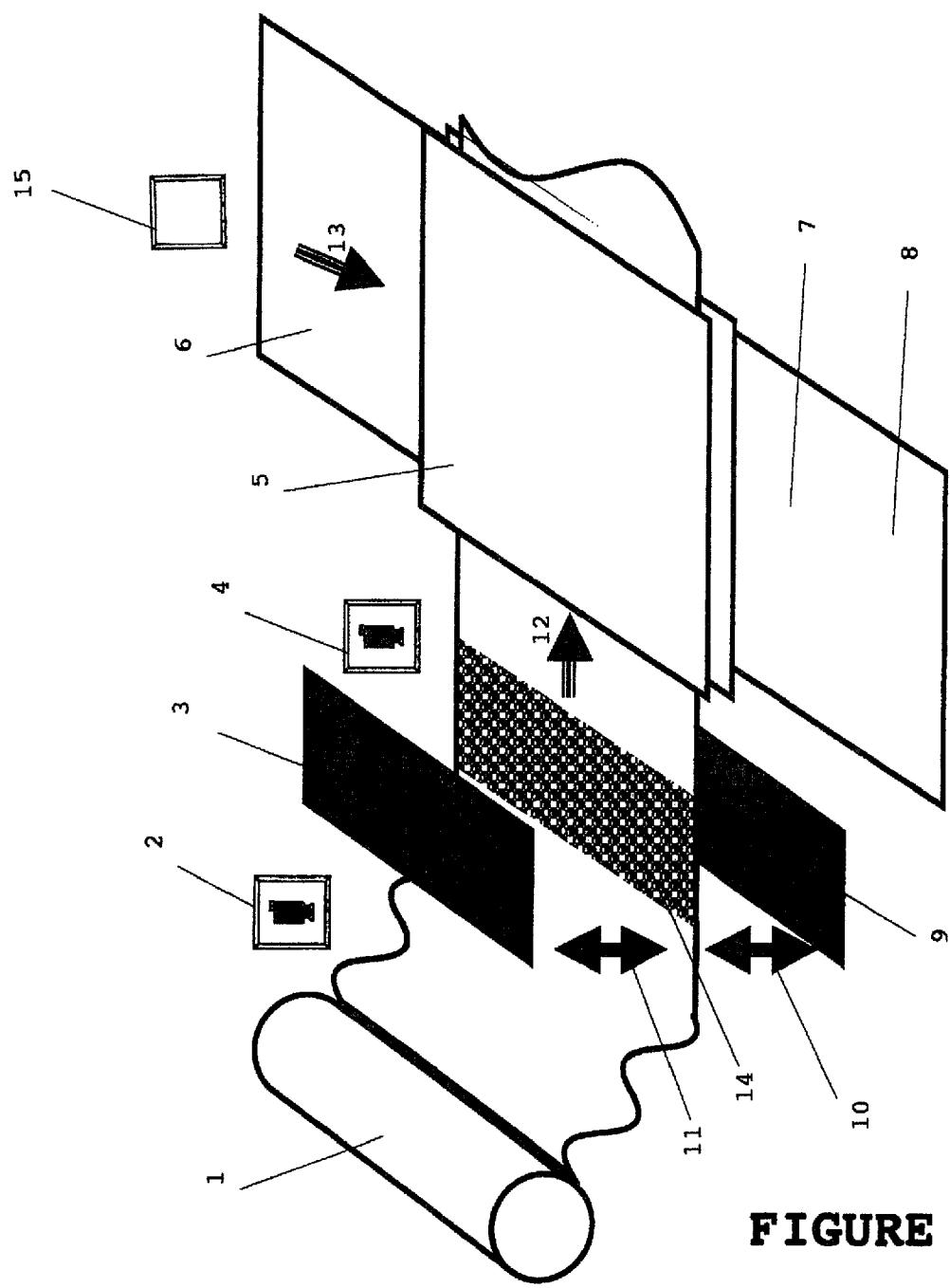
FIG. 1: A schematic diagram of a contact lens manufacturing apparatus according to an embodiment of the invention

FIG. 1 shows a schematic representation of an embodiment of the invention. A roll of polymer in the form of sheet, 1, is provided and is transported to a thermoforming area, 14. Prior to entering the thermoforming area the polymer sheet is inspected by means of an automatic vision system, 2, for significant defects, such as tears, that would result in an unsatisfactory final product.

The polymer may be Mowiol® (a material made by Clariant GmbH)—a copolymer of polyvinyl alcohol and polyvinyl acetate where the degree of hydrolysis, as measured by saponification, is at least 96% mol based on the original polyvinyl alcohol.

The polymer sheet is heated to a temperature where it is easy to shape the polymer into the desired shape as defined by inserts on the moulding platens, 3 and 9, in the thermoforming process and yet the polymer sheet still retains sufficient strength for it to be manipulated through the process.

The polymer sheet is then passed through the thermoforming area where platens, 3 and 9, containing optical quality inserts (not shown), shape the polymer sheet into the desired form. Depending on the properties of the polymer sheet, the inserts and the platens may be cooled or heated as required to obtain the required flow and optical clarity in the shaped part. The use of pressure or vacuum through the platens or inserts may also be used to achieve the desired shape. The optical inserts and their bodies, which fit into the platen, are so designed that the formed parts are not fully detached from the original polymer sheet and so that after the forming process has been completed the formed parts are moved forward with the polymer sheet, 12.

The formed parts are then inspected by means of an automated vision system, 4, for defects. The polymer sheet with formed parts may then be stored for use in the future or processed immediately as a continuous or semi-continuous process by passing it through a sterilising electron beam at station 5.

If the polymer provided was not fully crosslinked, then the exposure of the polymer sheet and the formed parts to an electron beam may be so controlled that the polymer becomes as crosslinked as is required as well as sterile as is required. The formed parts are separated from the polymer sheet and deposited into final packages within a sterile environment—schematically shown as occurring at station 5 in FIG. 1, although it is to be noted that packaging may occur at a separate station from electron beam irradiation (not shown).

The final packages 15 are manufactured and/or treated at station 6 so that they are effectively sterile and are maintained within an environment that keeps them, and the formed parts, sterile. The final packages are transported, 13, to a position to allow transfer of the formed parts into the final packages. The final packages holding the formed parts are transported within the sterile environment to a dosing station, 7, where aseptic or sterile packaging/hydration solution is added—controlled to be at a temperature below the temperature at which the polymer becomes water-soluble. The final packages, solution and formed parts are then sealed at station, 8, also within the sterile area, with a sterile foil before leaving the process area for final labelling.

"Ophthalmic lenses", as used herein, refers to any medical or vision correction devices that are used in the ocular environment, including contact lenses, intraocular lenses, corneal onlays and inlays, ocular drug delivery devices, ocular wound healing devices and the like.

A crosslinking portion of the lens production process involves the exposure of a dry lens shape made from the polymer to a high energy source. "High energy", as used herein, refers to many different forms and includes sources that generate, but is not limited to, thermal, I.R., U.V., microwave, gamma, ultrasonic and electron beam radiation.

"Crosslinking", as used herein, is used to describe the process in which a soluble polymer is converted into an insoluble form through the formation of bonds, i.e. crosslinks, between the polymer chains. It will be obvious to those skilled in the art that the insoluble form may, in addition to crosslinked structures, contain structures known as grafted polymers or entangled polymers.

One purpose of crosslinking, as used herein, is to permit the crosslinked dry lens to form a stable wet lens, as required by the design, and in doing so provide power correction to a wearer.

For polymers that are water-soluble the crosslinked polymer is known as a hydrogel.

"Polymer", as used herein, refers to the material from which the initial lens shape is produced and includes copolymers, mixtures of polymers, interpenetrating network systems, polymer systems that are already partially crosslinked, polymer to which additives have been added to assist in the crosslinking reaction, to reduce UV transmission, for therapeutic purposes, to add colour for cosmetic reasons and the like.

The energy source and radiation used for any crosslinking may vary, together with time of exposure, depending on the polymer composition and the properties required. In one preferred example of an ophthalmic lens, that of a hydrated contact lens, the final lens may comprise water content from 20 to 75%, by weight. It can be generally assumed that for a given polymer the crosslink density of the lens will control the water content of the lens, i.e. the greater the crosslink density the lower the water content.

In another example it is possible that the required levels of both crosslink density and sterility can be achieved simultaneously through exposure to radiation.

It is generally desirable that any crosslinking process is achieved as quickly as possible, preferably in less than 10 minutes, more preferably in less than 4 minutes, and even more preferably in less than one minute. In some polymer formulations it may be necessary for there to be more than one cycle to meet quality and performance requirements. At the same time it is also necessary to ensure the safety of the personnel operating the process and of the general environment. For these reasons the level of energy used for the crosslinking process may be lower than that practically required for the necessary level of crosslinking in one pass; this is compensated for by multiple passes.

Where the radiation crosslinking is effected by exposure to an electron beam or to gamma rays, additives, known as prorads, may be incorporated into the polymer at a level of 0.2 to 5% by weight for the purpose of promoting crosslinking. These compounds may be poly-functional vinyl or allyl compounds such as triallyl cyanurate, triallyl isocyanurate or pentaerithritol tetramethacrylate.

Radiation dosages will depend on the response of the polymer being irradiated and on the level, if any, of prorad. Typical dosages will be in the range 20 to 800 kGy, preferably 20 to 500 kGy, e.g. 20 to 200 kGy and particularly 40 to 120 kGy.

The finished, packaged lens may also be sterilised by any other appropriate means (e.g. ETO, gamma, steam etc.). Although the means of sterilisation will have to be carefully selected so as not to significantly change the properties or performance of the lens or package.

The invention claimed is:

1. A method of producing a plurality of soft contact lenses comprising the steps of:
   A. providing a sheet of solid, substantially dry material;
   B. forming said material into a plurality of shaped lens blanks through controlled application of physical force to the material by compression of the material between a plurality of form or platen pairs arranged in an array to simultaneously press together the material into a plurality of shaped lens blanks in a process selected from the group consisting of thermoforming, vacuum forming, pressing, hot moulding, cold moulding, and compression moulding; and
   C. hydrating said plurality of shaped lens blanks;
   wherein at least immediately subsequently to said physical forming step B, said plurality of shaped lens blanks remain at least partially attached to the sheet of material and the sheet is used as a transport medium or carrying mechanism for said plurality of shaped lens blanks.

2. A method of producing a plurality of soft contact lenses according to claim 1, wherein said sheet of solid substantially dry material is water soluble above a certain temperature, and formed into said plurality of shaped lens blanks at a temperature below said certain temperature.

3. A method of producing a plurality of soft contact lenses according to claim 2, in which said certain temperature is approximately 50° C.

4. A method of producing a plurality of soft contact lenses according to claim 2, in which said certain temperature is approximately 65° C.

5. A method of producing a plurality of soft contact lenses according to claim 1, in which the said material is chosen from the group consisting of polyvinyl alcohol or a copolymer of polyvinyl alcohol and polyvinyl acetate or polyethylene-maleic-anhydride or polymethyl-hydroxy-propyl-cellulose or copolymers of methyl acrylate or ethyl acrylate with ethylene or their hydroxyl derivatives.

6. A method of producing a plurality of soft contact lenses according to claim 1, in which said material is a copolymer of polyvinyl alcohol and polyvinyl acetate where the degree of hydrolysis, as measured by saponification, is at least 96% mol based on the original polyvinyl alcohol.

7. A method of producing a plurality of soft contact lenses according to claim 1, in which said material is a substantially uncrosslinked polymer comprising crosslinkable groups and in which, prior to the hydration step C, high energy is applied to said plurality of shaped lens blanks, whereby said polymer is crosslinked to a predetermined, desired crosslink density.

8. A method of producing a plurality of soft contact lenses according to claim 7, in which the material contains additives that react to the application of high energy to improve crosslinking efficiency.

9. A method of producing a plurality of soft contact lenses according to claim 7, in which the application of high energy involves irradiation of the plurality of shaped lens blanks by a form of high energy chosen from the group consisting of electron beam irradiation or gamma irradiation or microwave irradiation or ultraviolet irradiation or infrared irradiation or thermal irradiation or ultrasound irradiation.

10. A method of producing a plurality of soft contact lenses according to claim 1, wherein said plurality of shaped lens blanks are fully removed from the sheet at a stage after step B by the use of a laser cutting device.

11. A method of producing a plurality of soft contact lenses according to claim 1, in which said physical forming step B comprises the following substeps:
   B.1 heating said material to a temperature that:
   a) is near to the softening temperature of the material, whereby thermoforming of said material is possible, but
   b) is below the melting point of said material, whereby the physical integrity of said material is maintained; and
   B.2 thermoforming said plurality of shaped lens blanks through application of physical force to said material.

12. A method of producing a plurality of soft contact lenses according to claim 11, in which said thermoforming sub-step involves compression of the material between two forms or platens.

13. A method of producing a plurality of soft contact lenses according to claim 1, in which the physical forming step B involves the use of moulds and said material is placed between said moulds which are pressed together to form said plurality of shaped lens blanks.

14. A method of producing a plurality of soft contact lenses according to claim 1, in which high energy is applied to said plurality of shaped lens blanks and/or to said plurality of soft contact lenses in order to sterilise them.

15. A method of producing a plurality of soft contact lenses according to claim 14, in which the application of high energy involves irradiation by a form of high energy chosen from the group consisting of electron beam irradiation or gamma irradiation or microwave irradiation or ultraviolet irradiation.

16. A method of producing a plurality of soft contact lenses according to claim 1, which comprises the further step of:
   D. transferring the plurality of shaped lens blanks to a plurality of final packs.

17. A method of producing a plurality of soft contact lenses according to claim 16, in which, before the transferring step D, the final packs are sterilised.

18. A method of producing a plurality of soft contact lenses according to claim 17, in which, either before or after the transferring step D, aseptic or sterile solution is added to the sterile final packs which solution acts to hydrate the lenses in step C.

19. A method of producing a plurality of soft contact lenses according to claim 16, in which the material of the shaped lens blanks undergoes a chemical reaction in the final packs.

20. A method of producing a plurality of soft contact lenses according to claim 1, in which all process steps subsequent to step B are carried out without further human contact or handling.

21. A method of producing a plurality of soft contact lenses according to claim 1, which method is automated or semi-automated to run in a continuous or semi-continuous manner.

22. A method of producing a plurality of soft contact lenses according to claim 1, which further involves quality control inspections on the shaped lens blanks only.

23. A method of producing a plurality of soft contact lenses according to claim 22, which involves either visual quality control inspections or quality control inspections using an optical system.

24. A method of producing a plurality of soft contact lenses according to claim 19, in which the material undergoes a hydrolysis reaction in the final packs.

\* \* \* \* \*